Dec. 13, 1938.  C. A. KAUFMAN  2,139,755
HOSIERY AND METHOD OF MAKING THE SAME
Filed June 28, 1937  5 Sheets-Sheet 1
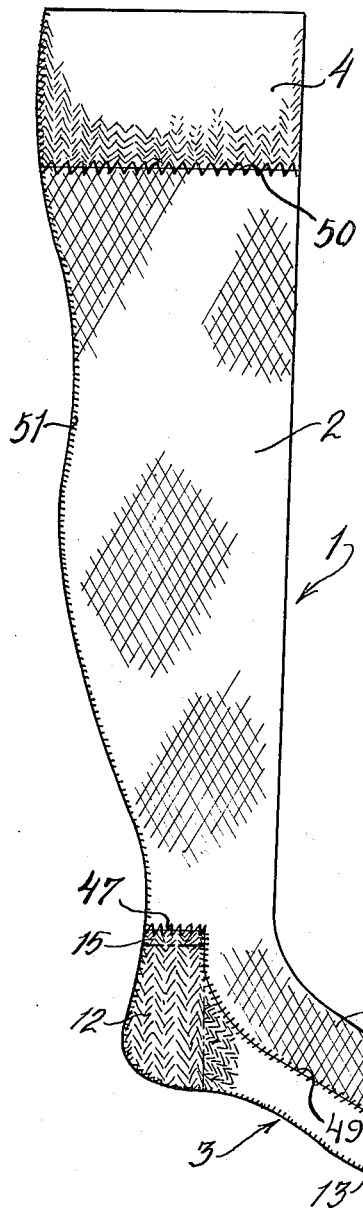
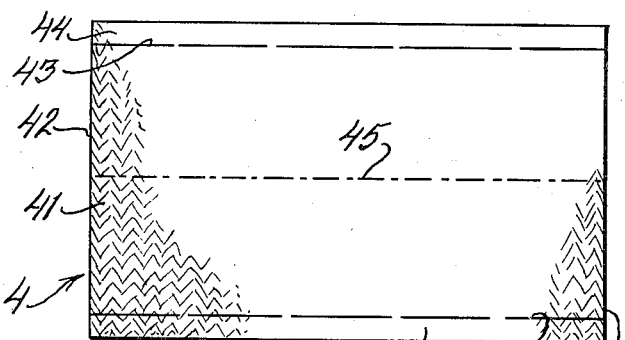
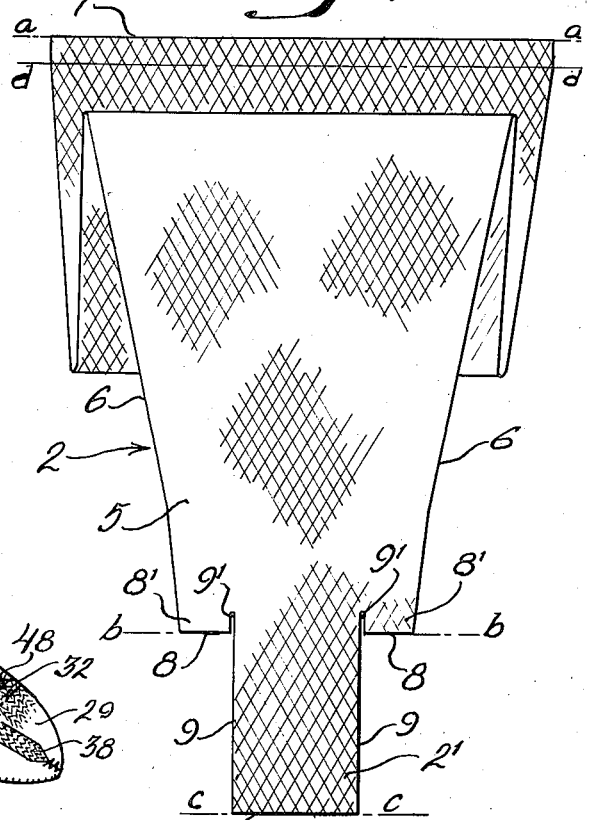
INVENTOR.
Charles A. Kaufman
BY
William R. Smith
ATTORNEY.

Dec. 13, 1938.  C. A. KAUFMAN  2,139,755
HOSIERY AND METHOD OF MAKING THE SAME
Filed June 28, 1937   5 Sheets-Sheet 2
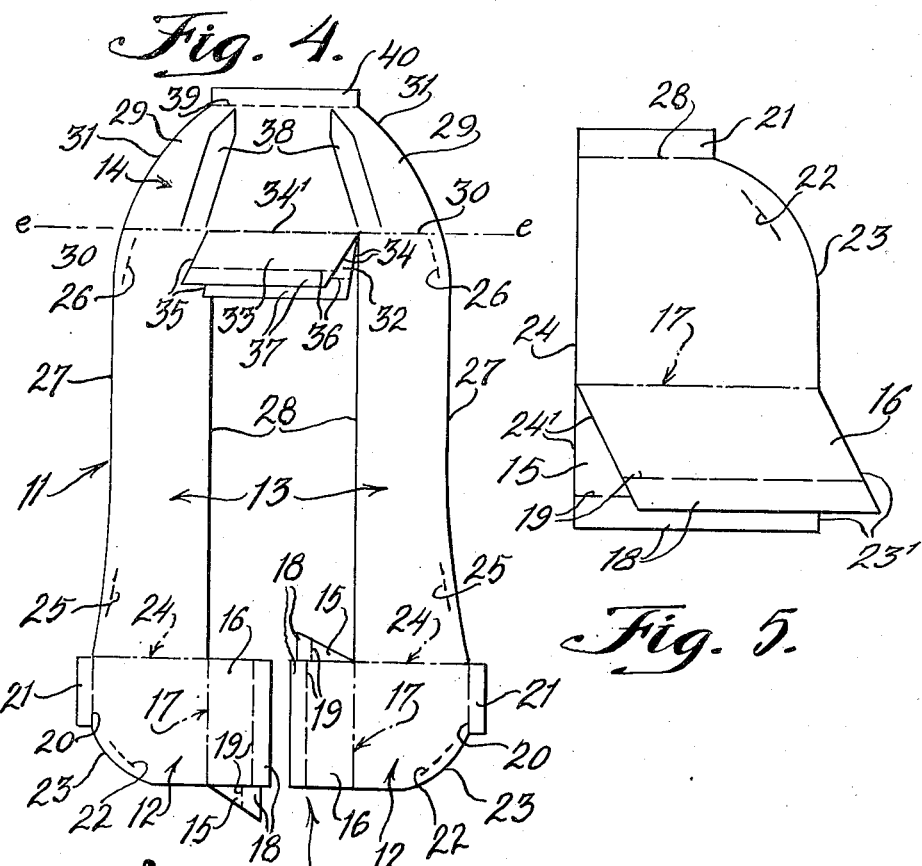
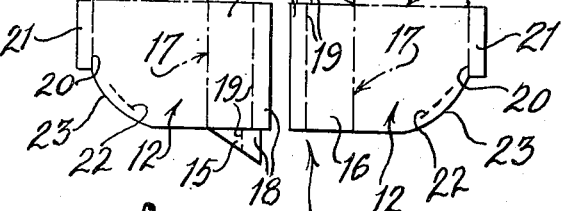
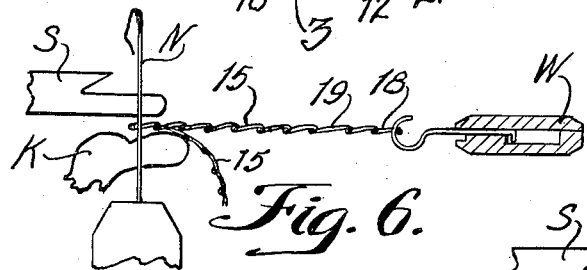
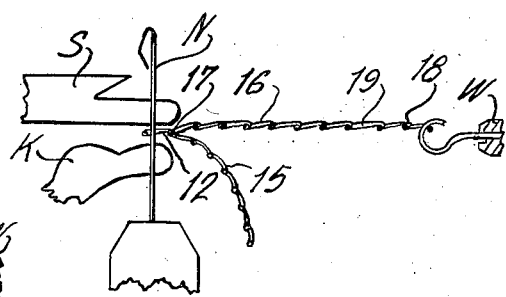
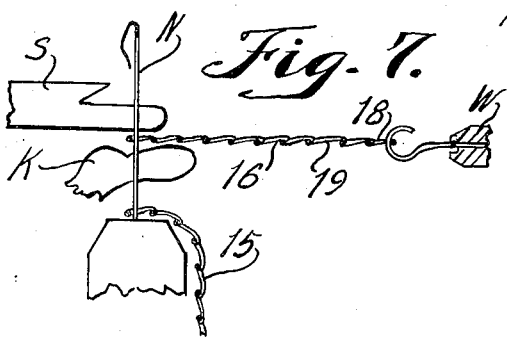
INVENTOR.
Charles A. Kaufman
BY
William R. Smith
ATTORNEY.

Dec. 13, 1938.         C. A. KAUFMAN         2,139,755
HOSIERY AND METHOD OF MAKING THE SAME
Filed June 28, 1937         5 Sheets—Sheet 3

INVENTOR.
Charles A. Kaufman
BY
William R. Smith.
ATTORNEY.

Dec. 13, 1938.    C. A. KAUFMAN    2,139,755
HOSIERY AND METHOD OF MAKING THE SAME
Filed June 28, 1937    5 Sheets-Sheet 4
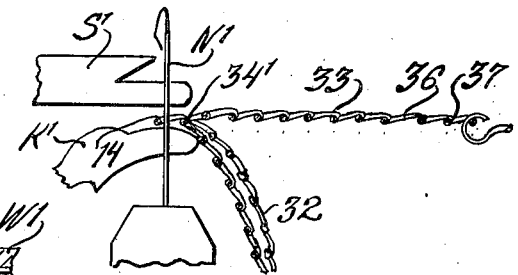
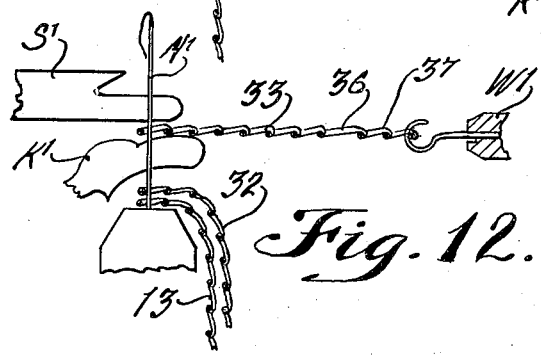
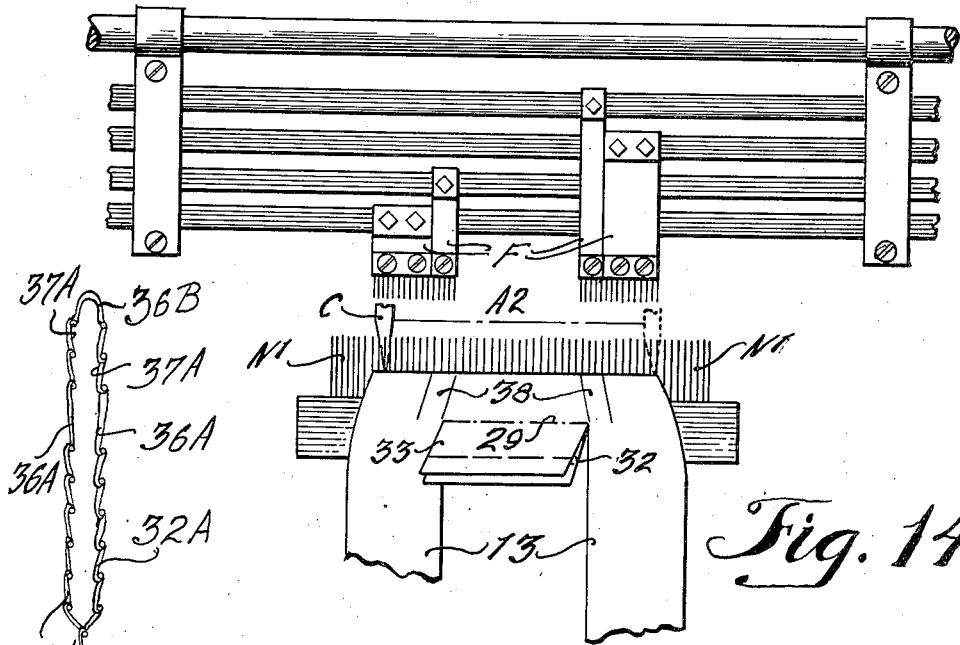
INVENTOR.
Charles A. Kaufman
BY
William R. Smith
ATTORNEY.

Dec. 13, 1938.  C. A. KAUFMAN  2,139,755
HOSIERY AND METHOD OF MAKING THE SAME
Filed June 28, 1937   5 Sheets-Sheet 5
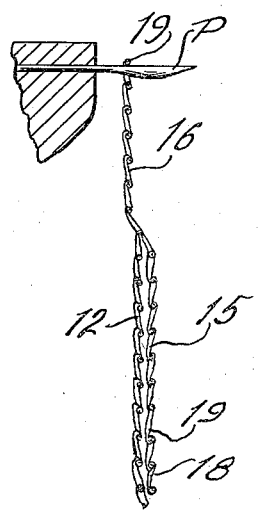
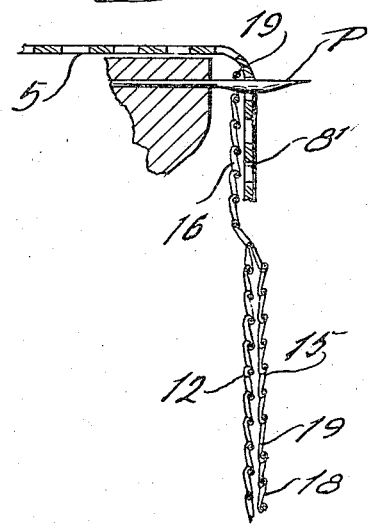
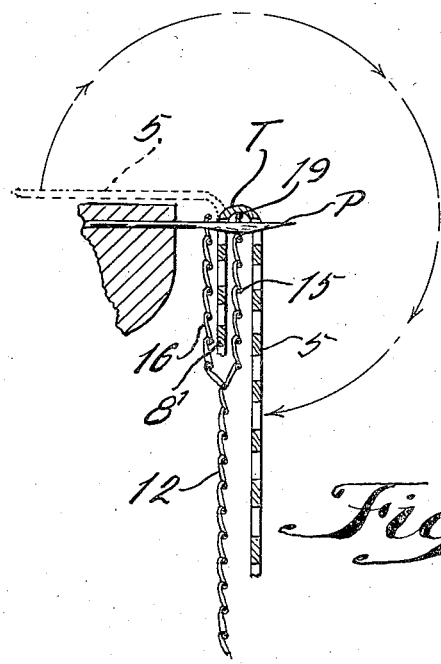
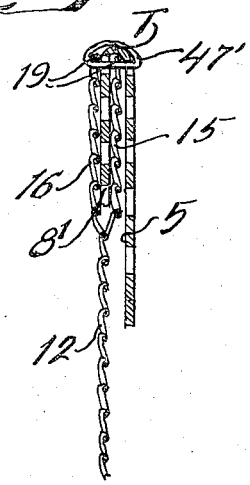
INVENTOR
Charles A. Kaufman
BY
William R. Smith
ATTORNEY Patented Dec. 13, 1938

2,139,755

UNITED STATES PATENT OFFICE 2,139,755

HOSIERY AND METHOD OF MAKING THE SAME

Charles A. Kaufman, New York, N. Y., assignor to Julius Kayser & Co., New York, N. Y.

Application June 28, 1937, Serial No. 150,674

20 Claims. (Cl. 66—183)

The present invention generally relates to hosiery and to the method of making the same. More particularly, the invention pertains to a method of manufacturing stockings of the type wherein the leg and instep portions are formed from cut fabric of any suitable construction, such as lace, mesh, or other like fabrics, to which are usually affixed weft knitted welt and foot fabrics.

The invention has for one of its main objects the provision of a method of knitting the welt and foot fabrics intended to be connected to a cut and sewed leg fabric of the character mentioned, in such a way that said welt and foot fabrics may be looped with the leg fabric by means of any suitable well known looping machine, and whereby a strong, smooth, and finished seam may be made at the points of connection of the welt and foot fabrics with the leg and instep of the stocking.

Another important object of the invention resides in the provision of a method of knitting a full fashioned foot whereby there are formed at certain portions thereof double thicknesses of fabrics adapted to constitute pairs of flaps intended to enclose a substantial amount of the corresponding portions of the cut leg fabric, and to be securely binded thereto by means of a looping operation, thereby forming a rigid seam capable of effectively resisting wear and tear at those points where strains and stresses are mostly apt to occur in the wearing of the stocking.

The invention is further characterized by an improved construction of a full fashioned knitted foot, which construction includes means intended to provide an assured and positive anchorage between said foot and the corresponding portions of a leg fabric blank of the cut and sewed type, and means adapted to facilitate the topping of said foot fabric onto a looping machine for interlooping connection with said leg fabric.

Other important objects and advantages of the invention will be in part obvious and in part pointed out hereinafter.

In order that the invention and its mode of operation may be readily understood by persons skilled in the art, I have, in the accompanying drawings and in the detailed description based thereupon, set out a possible embodiment of the invention.

In these drawings:—

Figure 1 is an elevation illustrating a finished stocking constructed in accordance with my invention.

Figure 2 is an elevation of a cut and shaped leg fabric blank.

Figure 3 illustrates the construction of a flat knitted welt fabric blank to be connected to the leg fabric blank.

Figure 4 is a representation of the foot fabric blank illustrating the construction thereof.

Figure 5 illustrates on an enlarged scale the construction of one of the heel fabrics.

Figures 6 to 8 inclusive are diagrammatic representations of the various steps followed in the knitting of the heel fabrics.

Figure 9:
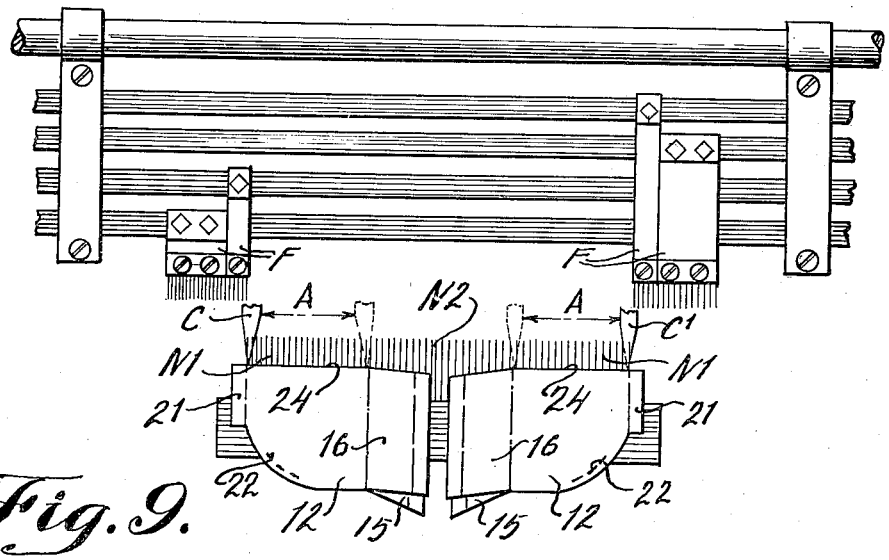

Figure 9 is a face elevation of a portion of a full fashioned knitting machine, showing the heel fabrics transferred thereon in position for knitting the sole fabrics.

Figure 10:
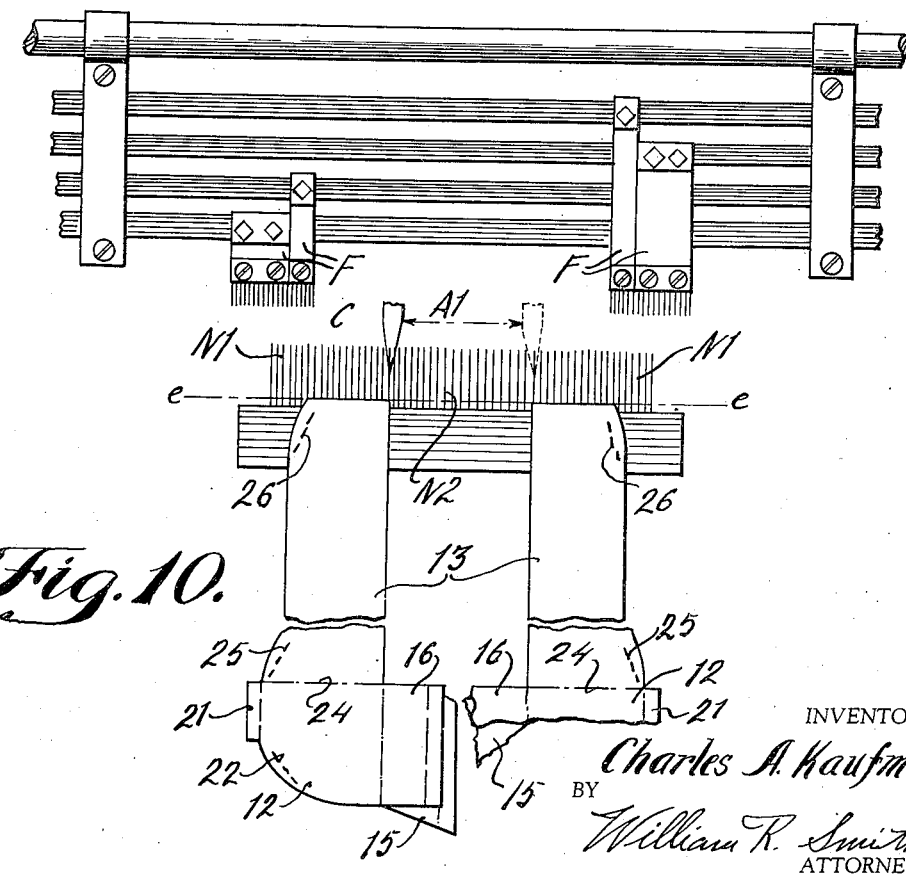

Figure 10 is a view similar to Figure 9, with the complete sole fabric thereon.

Figures 11 to 13 inclusive are diagrammatic representations of the different stages in the knitting of the toe.

Figure 14 is a face elevation of a portion of a full fashioned footer knitting machine illustrating the toe fabric in the process of being knitted.

Figure 14A is a diagrammatic representation of a modification of the method of making the toe and heel flaps.

Figures 15 to 18 inclusive are diagrammatic representations of the various steps followed in the looping operation to unite the foot blank to the leg blank.

Having more particular reference to the drawings, wherein like characters of reference will designate corresponding parts throughout, I have shown in Figure 1 a completed and finished stocking I consisting of a leg fabric 2, including an instep fabric 2'; a foot fabric 3; and a welt fabric 4.

The leg fabric 2 is preferably formed from a leg fabric blank 5 cut substantially in the shape represented in Figure 2 from a sheet of suitable fabric, preferably mesh, lace, or open-work knit fabrics. It will be noted that the opposite side edges 6 of the blank 5, from the marginal edge 7 along the line a—a at one end of the blank 5, are cut and fashioned so that said blank will suitably fit the shape of a human leg when said edges 6 are sewed together to form the stocking. It will also be noted that the edges 8 along the line b—b are cut at substantially right angles with respect to the edges 6 and to the edges 9, the latter extending between points defined by the said line b—b and the line c—c, which is along the marginal edge 10 of the other end portion of the blank.

Attention is called to the fact that the opposite portions of the leg fabric adjacent the marginal edges 8 and 9 are longitudinally slit, as shown at 9', whereby to provide a pair of depending tabs 8' for the purpose to be later specified. It is, of course, to be understood that the cutting of the blank along the edge 8, as shown herein, is specifically intended for the formation of an ordinary high-spliced heel, but if it is desirable to form a different type of heel, such as a pointed heel, then the blank may be cut so that the edge 8 will be an angle different from that shown in order to adapt itself to the formation of the desired type of heel.

The section of the blank from line b—b to the line c—c, the length of which section may vary, depending upon the foot size, constitutes the instep 2', and those portions thereof adjacent the edges 8, 9, and 10 are adapted to be connected to my improved foot 3, the construction of which is more clearly shown in Figure 4.

As represented in said Figure 4, the foot 3 is made from a foot fabric blank 11 comprising a pair of complementary heel fabrics 12, a pair of complementary sole fabrics 13, and a toe fabric 14.

One end of each heel fabric 12 is provided with a pair of fabric flaps 15 and 16 respectively extending from the heel fabric demarking line 17 and each terminating with a topping tab 18, a topping course 19 being formed between the tab 18 and its associated flap. According to the showing made herein, the fabric flap 15 is the normal outside flap, whereas the fabric flap 16 is the normal inside flap. The other end of each heel fabric 12 is likewise provided with a topping course 20 and a topping tab 21. It will, of course, be understood that each heel fabric may be narrowed as shown at 22, to impart a proper curve shaping to one selvedge edge 23 thereof, the other selvedge 24 being substantially straight. In this connection, it is to be noted that the selvedge edges 23' and 24' of the fabric flaps 15 and 16 extend as a continuation of the selvedge edges 23 and 24 of the heel fabrics. Whereas the two heel fabrics 12 are of identical construction, they are so manufactured that one serves as the right heel and the other as the left heel.

The sole fabrics 13 start at the selvedge edge 24 of the heel fabrics 12, extend therefrom for a length sufficient to correspond to the desired size of the foot being knitted, and terminate at the point indicated in Figure 4 by the line e—e, where the knitting of the toe begins.

Each sole fabric may be narrowed in the usual way in the vicinity of its starting and terminating portions, as represented at 25 and 26, whereby the outer selvedge edges 27 may assume the proper curve shape, the inner selvedge 28 remaining substantially straight.

The toe fabric 14 has its side portions 29 interknitted with the sole fabrics 13, as shown at 30, so that the selvedge edges 31 of said toe fabric become a continuation of the outer selvedge edges 27 of said sole fabrics.

Interknitted, as at 34', to the intermediate portion of the toe fabric is a pair of fabric flaps 32 and 33 respectively extending between the sole fabrics and having a width approximately equal to the distance from the inner selvedge of one of said sole fabrics to the inner selvedge of the remaining sole fabric so that the selvedge edges 34 and 35 of said fabric flaps lay in parallel close relation to the selvedge edges 28 of said sole fabrics. Again, according to the showing, the fabric flap 32 is the normal outside flap and the fabric flap 33 is the normal inside flap.

Each fabric flap 32 and 33 terminates with a topping course 36 and a topping tab 37.

The usual toe gores 38, topping course 39, and topping tab 40 may be provided in the toe fabric 14.

The welt 4 may be of any suitable or desirable construction but, as represented in Figure 3 of the drawings, is preferably made from a flat knitted fabric blank 41 of general rectangular formation with the selvedge edges 42 thereof adapted to become substantially aligned with the selvedge edges 6 of the fabric 5 when connected thereto. The opposite end portions of the welt fabric are formed with a topping course 43 and topping tab 44. The welt is adapted to be folded along its medial portion 45 whereby to form the commonly known double welt.

In knitting the foot blank, the heel fabrics 12 are first made on any type of flat knitting machine capable of adapting itself to the work, for instance, on the well known "Reading" full fashioned knitting machine with which those skilled in the art are familiar.

The mode of procedure in knitting the heel fabric will be clearly understood from the showing made in Figures 5 to 8 inclusive.

When starting the heel fabric (shown in detail in Figure 5) an ordinary welt bar W is brought into operative relation with the needles N, sinkers S, and knock-over bits K, to engage, in the usual way, the initial knitted course and subsequently draw the fabric out of the knitting field as the knitting of said fabric progresses.

A sufficient number of courses are knitted to form the tab 18 of the outside fabric flap 15, then a loose course is made through the normal operation of the machine to provide the topping course 19, and thereafter the fabric flap 15 is completed, as shown in Figure 6.

With completion of the outside fabric flap 15, the machine is stopped, said fabric flap is slid down the shank of the needles N below the knock-over bits K, the welt bar W is disengaged from the fabric, and again brought to function with the starting of the machine for beginning the inside fabric flap 16, which is knitted in the same manner as is the outside fabric flap 15 and as shown in Figure 7.

At this point, it is to be noted that the fabric flaps 15 and 16 are made on substantially the same number of needles and have substantially the same number of courses, so that the dimensional size of the companion flaps will be the same. When the knitting of the fabric flap 16 is finished the machine is again stopped, the fabric flap 15 is brought back above the knock-over bits K, and the heel fabric 12 is knitted integrally with the fabric flaps 15 and 16, as illustrated in Figure 8, the knitting being carried on to complete the heel fabric.

The machine is so adjusted that during the knitting of said heel fabric, it will function through its usual narrowing mechanism to form the narrowing marks 22 in that portion of the heel fabric adjacent the selvedge edge 23 whereby said selvedge edge gradually moves inwardly with respect to the remaining selvedge edge 24, thus narrowing the width of the fabric. The heel fabric is finished with a topping course 20 and topping tab 21 for the purpose to be hereinafter fully explained. As hereinbefore stated, the heel fabrics are so knitted that one forms the right heel while the other forms the left heel.

It will be appreciated that heel fabric blanks of the character described may be manufactured in stock quantities and at odd times, inasmuch as the heel fabrics need not be utilized immediately, but may be stored for future use when foot blanks are required.

When making a foot blank, two completed heel fabric blanks 12, that is, one right and one left heel fabric blank, are transferred on a knitting section of a commonly known full fashioned footer knitting machine by engaging the loops at the selvedge edge 24 of said heel blanks with a certain number of end needles N1, the heel blanks being relatively disposed so that the fabric flap sides thereof will be facing each other in a manner more fully represented in Figure 9. The two heel fabric blanks 12 are so placed on the needles of the footer knitting machine that the distance therebetween will correspond to the width of the instep portion of the foot blank.

With the heel fabrics being thus transferred on the knitting machine, the latter is operated to simultaneously knit the pair of sole fabrics 13, one sole fabric being knitted onto each heel fabric blank. In knitting said sole fabrics, I prefer to use one yarn carrier to form each sole fabric, each carrier being separately operated, that is, each carrier being individually connected to a separate carrier bar (not shown) operable, through the usual well known yarn feeding mechanism of an ordinary full fashioned footer, to impart an independent reciprocatory movement to the respective carriers C and C', for causing the same to lay the yarn back and forth over a required number of end needles, as indicated by the arrow A in Figure 9. Of course, it is to be understood that additional carriers may be brought to work in conjunction with each of the main carriers C or C', for instance, when it is desired to knit a plated fabric, and in that event the additional carriers are adjusted to operate in proper relation with respect to the main carrier, a matter well understood by those skilled in the art.

During the knitting of the sole fabrics, the narrowing fingers F are caused to function in the usual way to form the narrowings 25 and 26 for the purpose hereinbefore specified.

When there has been knitted a sufficient amount of fabric to constitute the soles, that is, when the knitting has been carried out to the point represented by line e—e (Figures 4 and 10) where the knitting of the toe is to begin, the machine is stopped and the sole fabrics 13 are slid beneath the knock-over bits K'. The carriers are readjusted so that one or more carriers will reciprocate over the intermediate needles N2, as represented by the arrow A1 in Figure 10, and the machine is then started to knit the normal outer fabric flap 32 with its topping tab 37 and topping course 36, a welt bar W' being used to start and draw the fabric away from the needles N' and sinkers S' disposed in the knitting field, in the manner shown in Figure 11.

The outer fabric flap 32 being finished, the machine is again stopped, said flap is slid beneath the knock-over bits K', the machine is once more started and the normal inner flap 33 with the topping tab 37 and topping course 36 is knitted as shown in Figure 12, the welt bar W' being again used to start and draw the fabric from the knitting field.

After completion of the inner fabric flap 33 and while the machine is stopped the outer fabric flap 32 and the sole fabrics 13 are brought back over the knock-over bits, in the manner shown in Figure 13. Thus, as will clearly appear from Figure 14, the sole fabrics 13 lie in the knitting field of the end needles N1 and the fabric flaps 32 and 33 in the knitting field of the intermediate needles N2, said fabric flaps being disposed in over-lapping relation. The various fabrics being thus arranged, the carriers C are finally adjusted so that one or more carriers will feed the yarn in one continuous stroke over the end and intermediate needles N1 and N2, as shown by the arrow A2 in Figure 14, to knit the toe fabric 29 which thus becomes interknitted with said sole fabrics 13 and flaps 32 and 33.

In knitting the toe fabric, the narrowing fingers F of the machine are operated in the well known manner to form the toe gores 38. The knitting machine is further operated to knit the topping course 39 and the topping tab 40 onto the toe fabric 29.

Attention is called to the fact that the fabric flaps 32 and 33, instead of being knitted after the completion of the sole fabrics, may be knitted simultaneously with the knitting of the initial portion of said sole fabrics, that is to say, when the heel fabrics have been transferred onto the footer, as previously described and shown in Figure 9, an additional carrier may be caused to operate over the intermediate needles N2 simultaneously with the operation of the carriers C and C' over the sets of end needles N1. The machine is operated in this manner until the outer and inner fabric flaps have been knitted, as hereinbefore stated, whereupon the operation of the additional carrier is disrupted until completion of the sole fabric, when said flaps are brought into the knitting field and the knitting of the toe fabric carried out, as already explained.

The completed foot blank is then ready to be connected to a leg blank such as shown in Figure 2, and the steps which I prefer to follow in effecting this connection will now be described.

The heel fabrics 12 are topped on the looping points P of a suitable known looping machine, such as the "Wright steady dial machine," by placing, for instance, the looping courses 19 of the fabric flaps 16 in engagement with said points P, the topping on being facilitated by the provision of the tabs 18 which, after the topping, are raveled out, preferably by hand, until the heel fabrics hang from the points in the usual manner and as shown in said Figure 15.

The portions of the leg fabric adapted to be connected to the heel fabrics are then topped on the points P of the looping machine so that the tabs 8' of said leg blank hang down below the points and lay over the flaps 16 already in engagement with the looper points, the leg fabric itself remaining above said points which may be accomplished simply by laying the leg blank upon the top of the looping machine, as shown in Figure 16.

As illustrated in Figure 17, the flaps 15 are then brought up from their hanging positions and the topping courses 19 thereof topped on the looping points by means of the topping tabs 18 which may then be raveled out. Thus it will be clearly understood that by reason of the engagement of the several fabrics with the looping points in the order stated, the tabs 8' of the leg fabric become "sandwiched" between their respective pairs of flaps 15 and 16.

As diagrammatically shown in Figure 17, the leg blank is then turned down to hang from the looping points over the heel fabrics. In turning the leg blank, the loops thereof in engagement with the looping points, must be guided about the latter so that the fabric will not drop off.

From the foregoing description, it will be appreciated that an important characteristic feature of the present invention resides in the particular mode of topping the various fabrics to be united in making a stocking of the type to which this invention pertains. The topping steps, accomplished in the order and in the manner described, result, as is designated at T, in supporting on the looper points P by a single thread a double thickness of the leg fabric blank, said thicknesses being represented by the tab 8' and the folded portion of said blank, and "sandwiching" one of the thicknesses, that is, the tab 8', between a pair of knitted fabric flaps suspended by a topping course from said points.

The several fabrics having thus been topped on the points of the looping machine, the same may then be operated to unite said fabrics, as shown at 47' in Figure 18, thus forming in the usual well known manner a looped seam 47 (Figure 1) integrally connecting the heel fabrics to the corresponding portions of the leg fabric.

Attention is called to the fact that by reason of the mode of knitting the heel and toe sections of the improved foot as a continuation of the fabric flaps, the loops at the edge of said flaps to be topped on the looping points are sinker and divider loops. Accordingly, the looping operation unites sinker and divider loops with the open mesh fabric therebetween, constituting a characteristic feature of the present invention.

The flaps 32 and 33 of the toe fabric 29, and the corresponding portion of the foot blank, that is, the portion thereof adjacent the marginal edge 10 at the extremity of the instep fabric 2', are to be looped likewise to form the looping seam 48, as represented in Figure 1.

The looping of the toe and heel fabrics, of course, leaves free the marginal side edges 9 of the instep fabric 2'. Such edges may then be sewed or seamed according to the usual mode of procedure to the corresponding selvedge edges 24' of the heel flaps 15 and 16, and to the selvedge edges 28 of the sole fabrics, to form the seam 49 Figure 1), said seam 49 continuing along the selvedge edges 34 and 35 of the toe flaps, thereby joining the latter to the sole fabrics and thus completing the connection of the foot blank to the leg blank.

Although the welt blank 41 may be connected to the corresponding portion of the leg blank in any suitable known manner, I prefer to effect the connection in a manner similar to that in which the connections of the heel at 47 and the foot at 48 are made. Accordingly, the welt blank is topped onto the looper points along the upper topping course in Figure 3, the topping being done with the aid of the associated topping tab 44 which is then raveled off. It is to be understood that in this position the main body of the welt blank hangs down from the looping points. The corresponding portion of the leg blank, that is, the portion immediately below the marginal edge 7, is topped on the looping points approximately along the imaginary line d—d so that a substantial amount of the leg fabric hangs from the points in overlapping relation with the topped portion of the welt, while the body of the leg fabric is thrown, if desired, over the top of the looping machine and remains above said points. The welt blank 41 is then folded upon itself along its medial portion 45 by bringing its hanging edge upwardly so that the other topping course 43 may be topped on the points by means of the associated topping tab 44, thus "sandwiching" the leg portion aforesaid between the outer and inner part of the folded welt.

Subsequent to the ravelling of the last mentioned topping tab 43, the leg fabric is folded so as to hang down from the looping points in the manner set forth in the description of the heel connection 47 and toe connection 48 in order that the looping may be carried out to form the looping seam 50 (Figure 1).

Due to the particular feature of the loop connection between the toe, heel, welt, and leg fabrics, and particularly because of the fact that a portion of said leg fabric becomes enclosed within a pair of fabric flaps, integrally knitted with the foot blank and with the double welt, it will be appreciated that a strong, durable, and stress-resisting seam is afforded at those points where most strains occur in the wearing of the stocking. Also due to the particular mode of topping the various fabrics and because of their looping in the manner described, a smooth flexible juncture is obtained at the looping seam. In this connection and especially with reference to the parts represented at T and at 47' in Figures 17 and 18, it is pointed out that whereas the showing made in said figures has been greatly enlarged for the sake of clarity, in actuality said parts are relatively smaller so that when the fabric portion 5 is turned upwardly after the stocking has been looped, the fabric lays flat at the looping.

The stocking is completed in the usual way, that is, the heel fabrics are looped together by placing the topping course 20 in engagement with the points of a looping machine by means of the topping tabs 21 which are thereafter raveled or cut off in the course of the operation; the toe fabric is looped along the topping course 39, the tab 40 having been raveled or cut off after serving its purpose in topping on; and finally the connected leg, foot, and welt blanks are sewed along their respective edges 6, 23, 23', 27, 31, and 42 to form the back seam 51 (Figure 1).

It is to be understood that the foregoing description sets forth a possible embodiment of the invention and that the same is capable of modifications without departing from the essence of the invention. For instance, in Figure 14A I have shown a modification in the method of making the toe and heel flaps. According to this modified method, and as represented in said Figure 14A, the fabric flaps 32a and 33a are made in a manner similar to the making of an ordinary full fashioned stocking welt, that is, after a sufficient amount of fabric has been knitted, the same is turned upon itself to be subsequently cut along its medial portion for providing the pair of flaps 32a and 33a.

It is to be noted that the folded fabric intended to constitute the flaps is provided with a pair of loosely knitted topping courses 36a and a pair of topping tabs 37a which serve to facilitate the topping of the fabric on the points of the looping machine in the manner hereinbefore described. The medial portion of the fabric where the same is to be cut may also be provided with a loose course 36b which will act as a guide line in the folding and cutting operations.

It will be noted that after severing the welt-like fabric to form the pair of flaps 32a and 33a, the loops at the selvedge of one flap are needle loops, whereas the loops at the edge of the remaining flap are sinker and divider loops. Therefore, in performing the looping operation, needle loops and sinker and divider loops with the open mesh fabric therebetween are connected together.

In concluding, I wish it to be understood that other modifications in the mode of practicing and constructing the invention may be made and, therefore, any modifications coming within the scope of the subjoined claims are to be considered within the spirit of the invention.

What I claim is:

1. The method of knitting a full fashioned foot fabric blank, comprising knitting heel fabrics with pairs of paralleling flaps extending therefrom, transferring said heel fabrics to knit thereonto sole fabrics extending in a direction at substantially right angles to that of said flaps, and knitting a toe fabric as a continuation of said sole fabrics with a pair of paralleling flaps extending between the sole fabrics.

2. The method of knitting a full fashioned foot fabric blank adapted to be connected to a cut, open-work fabric leg blank, comprising knitting heel fabrics with pairs of paralleling flaps extending therefrom for connection to the corresponding portions of the leg fabric, transferring said heel fabrics to knit thereonto sole fabrics extending in a direction at substantially right angles to that of said flaps, and knitting a toe fabric as a continuation of said sole fabrics with a pair of paralleling flaps extending between the sole fabrics for connection to the corresponding portion of the leg fabric.

3. The method of making hosiery of the character described, comprising cutting a leg blank out of open-work fabric, knitting a full fashioned foot fabric blank with a pair of fabric flaps at certain portions thereof, enclosing between said flaps the corresponding portions of the foot fabric blank by transferring the same in overlapping relation upon a looping machine, and seaming together the marginal edges of the remaining portions of the leg and foot fabric blanks.

4. The method of making hosiery of the character described, comprising cutting a leg blank out of open-work fabric, knitting a full fashioned foot fabric blank with a pair of fabric flaps at the heel and toe portions thereof, enclosing between said flaps the corresponding portions of the foot fabric blank by transferring the same in overlapping relation upon a looping machine, and seaming together the marginal edges of the remaining portions of said leg and foot fabric blanks.

5. A stocking of the character described comprising: a cut mesh-like fabric leg blank and a full fashioned weft knitted fabric foot blank adapted to be connected to said leg blank including a pair of heel fabrics and a toe fabric, said heel and toe fabrics each having a pair of fabric flaps extending therefrom and adapted to enclose the corresponding part of said leg fabric for interlooping, seamed connection therewith.

6. A stocking of the character described comprising: a cut mesh-like fabric leg blank and a full fashioned weft knitted fabric foot blank adapted to be connected to said cut leg blank and consisting of a pair of heel fabrics, a pair of sole fabrics knitted as a continuation of said heel fabrics, and a toe fabric knitted as a continuation of said sole fabrics, said heel and toe fabrics each having a pair of fabric flaps extending therefrom and adapted to enclose the corresponding part of said leg fabric for interlooping, seamed connection therewith.

7. A stocking having a cut, open-work fabric leg portion and a full fashioned knitted fabric foot portion adapted to be connected at its inner marginal edges to the corresponding part of the leg fabric portion, said foot fabric portion consisting of a pair of heel fabrics and a pair of sole fabrics knitted as a continuation of said heel fabrics, and a toe fabric knitted as a continuation of said sole fabrics, said heel and toe fabrics each having a pair of fabric flaps extending therefrom and adapted to enclose the corresponding part of said portion of the leg fabric, and the marginal edges of said sole fabrics being seamed to the remaining sections of said part of the foot fabric.

8. The method of manufacturing a stocking of the character described comprising: forming a foot blank by knitting heel tabs with pairs of paralleling flaps extending therefrom; then transferring said heel fabrics to knit thereonto sole fabrics extending in a direction at substantially right angles to that of said flaps and knitting a toe fabric as a continuation of said sole fabrics with a pair of paralleling flaps extending between the sole fabrics; cutting a combination leg and instep blank out of open work mesh-like fabric; supporting by a single thread on the points of a looping machine double thicknesses of the leg fabric blank at those portions thereof intended for connection to the foot blank at the heel and toe; sandwiching one of said thicknesses at each of said portions between the corresponding pair of flaps; and looping said flaps with the thicknesses of leg fabric sandwiched therebetween.

9. The method of manufacturing a stocking of the character described comprising: forming a foot blank by knitting heel tabs with pairs of paralleling flaps extending therefrom; then transferring said heel fabrics to knit thereonto sole fabrics extending in a direction at substantially right angles to that of said flaps and knitting a toe fabric as a continuation of said sole fabrics with a pair of paralleling flaps extending between the sole fabrics; cutting a combination leg and instep blank out of open work mesh-like fabric; supporting by a single thread on the points of a looping machine double thicknesses of the leg fabric blank at those portions thereof intended for connection to the foot blank at the heel and toe; sandwiching one of said thicknesses at each of said portions between the corresponding pair of flaps by topping one edge thereof onto said points on either side of the mentioned thicknesses of leg fabric; and looping said flaps with the thicknesses of leg fabric sandwiched therebetween.

10. The method of manufacturing a stocking of the character described comprising: forming a foot blank by knitting heel fabrics with pairs of paralleling flaps extending therefrom; then transferring said heel fabrics to knit thereonto sole fabrics extending in a direction at substantially right angles to that of said flaps, and knitting a toe fabric as a continuation of said sole fabrics with a pair of paralleling flaps extending between the sole fabrics; cutting a combination leg and instep blank out of open work mesh-like fabric; placing those portions of the leg fabric blank intended for connection with the foot blank at the heel and toe between said fabric flaps so that the latter enclose a corresponding leg blank portion placed therebetween; and looping the fabric flaps at their marginal edges by loop-stitching the same, thereby engaging said edges of the fabric flaps with the associated portions of the leg fabric blank intermediate its marginal edge.

11. The method of manufacturing a stocking of the character described comprising: forming a foot blank by knitting heel fabrics with pairs of paralleling flaps extending therefrom; then transferring said heel fabrics to knit thereonto sole fabrics extending in a direction at substantially right angles to that of said flaps, and knitting a toe fabric as a continuation of said sole fabrics with a pair of paralleling flaps extending between the sole fabrics; cutting a combination leg and instep blank out of open work mesh-like fabric; placing those portions of the leg fabric blank intended for connection with the foot blank at the heel and toe between said fabric flaps so that the latter enclose a corresponding leg blank portion placed therebetween; and looping the fabric flaps together, thus enclosing the fabric of said leg blank portions therebetween.

12. The method of manufacturing a stocking of the character described comprising: knitting a foot blank with heel and toe portions; and with a pair of fabric flaps at said heel portion; and a pair of fabric flaps at said toe portion; cutting a combination leg and instep blank out of open work mesh-like fabric with portions corresponding to the heel and toe of the foot blank; enclosing said corresponding portions of the leg fabric blank between said flaps; and seaming the flaps of each pair for binding therebetween the enclosed corresponding portion of the leg fabric blank.

13. The method of manufacturing a stocking of the character described comprising: knitting a foot blank with heel and toe portions; and with a pair of fabric flaps at said heel portion and a pair of fabric flaps at said toe portion; cutting a combination leg and instep blank out of open work mesh-like material with portions corresponding to the heel and toe of the foot blank; enclosing said corresponding portions of the leg fabric blank between said flaps; and forming an interlooping seamed connection between the flaps of each pair for binding therebetween the enclosed corresponding portions of said leg fabric blank.

14. The method of manufacturing a stocking of the character described comprising: knitting a foot blank with heel and toe portions; and with a pair of fabric flaps at said heel portion and a pair of fabric flaps at said toe portion; cutting a combination leg and instep blank out of open work mesh-like material with portions corresponding to the heel and toe of the foot blank; enclosing said corresponding portions of the leg fabric blank between said flaps; and forming on a looping machine an interlooping seamed connection between the flaps of each pair for binding therebetween the enclosed corresponding portions of said leg fabric blank.

15. The method of manufacturing a stocking of the character described comprising: forming a foot blank by knitting heel fabrics with pairs of paralleling flaps extending therefrom; then transferring said heel fabrics to knit thereonto sole fabrics extending in a direction at substantially right angles to that of said flaps and knitting a toe fabric as a continuation of said sole fabrics with a pair of paralleling flaps extending between the sole fabrics; topping one of each of said pairs of flaps upon the points of a looping machine; then topping the corresponding portions of the leg fabric upon said points of the looping machine; and finally topping the other of each of said pairs of flaps upon said points of the looping machine.

16. The method of manufacturing a stocking of the character described comprising: forming a foot blank by knitting heel fabrics with pairs of paralleling flaps extending therefrom; then transferring said heel fabrics to knit thereonto sole fabrics extending in a direction at substantially right angles to that of said flaps and knitting a toe fabric as a continuation of said sole fabrics with a pair of paralleling flaps extending between the sole fabrics; topping the marginal edge of one of each of said pairs of flaps upon the points of a looping machine; then topping the corresponding portions of the leg fabric intermediate its marginal edge upon said points of the looping machine; and finally topping the marginal edge of the other of each of said pairs of flaps and looping the topped fabrics together thereby enclosing said portions of the leg fabric between the flaps.

17. The method of manufacturing a stocking of the character described comprising: forming a foot blank by knitting heel fabrics with pairs of paralleling flaps extending therefrom; then transferring said heel fabrics to knit thereonto sole fabrics extending in a direction at substantially right angles to that of said flaps and knitting a toe fabric as a continuation of said sole fabrics with a pair of paralleling flaps extending between the sole fabrics; topping the marginal edge of one of each of said pairs of flaps upon the points of a looping machine; then topping the corresponding portions of the leg fabric intermediate its marginal edge upon said points of the looping machine; and finally topping the marginal edge of the other of each of said pairs of flaps, looping the topped fabrics together thereby enclosing said portions of the leg fabric between the flaps; and seaming together the remaining portions of the foot and leg blanks.

18. The method of manufacturing a stocking of the character described comprising: forming a foot blank by knitting heel fabrics with pairs of paralleling flaps extending therefrom; then transferring said heel fabrics to knit thereonto sole fabrics extending in a direction at substantially right angles to that of said flaps, and knitting a toe fabric as a continuation of said sole fabrics with a pair of paralleling flaps extending between the sole fabrics; topping one of each of said pairs of flaps on the points of a looping machine so that the foot blank, with its remaining flaps, hang down from the points; topping the corresponding portions of the leg blank on said points so that a portion thereof hangs down from the points over the topped flaps; topping the other of each of said pairs of flaps onto the looping points, thereby sandwiching the topped portions of the leg blank between the flaps; folding the main portion of the leg blank so that the same will hang from the points over the topped flaps and the portions sandwiched therebetween; and looping the topped flaps with the leg portions therebetween.

19. The method of manufacturing a stocking of the character described comprising: forming a foot blank by weft knitting heel fabrics with pairs of paralleling flaps extending therefrom; then transferring said heel fabrics to knit thereonto sole fabrics extending in a direction at substantially right angles to that of said flaps; weft knitting a toe fabric as a continuation of said sole fabrics with a pair of paralleling flaps extending between the sole fabrics; cutting a combination leg and instep blank out of open work mesh-like fabric; topping the marginal edge of one of each of said pairs of weft knitted flaps so that each looper point subtends its corresponding needle loop; topping on the looper points the corresponding portions of said open work mesh-like leg fabric so that a plurality of looper points lay in each interstice with a substantial portion of said leg fabric projecting above the looper points; topping the marginal edge of the other of each pair of weft knitted flaps so that each looper point subtends its corresponding needle loop; folding downwardly a substantial portion of the mesh-like leg fabric which previously projected above the looper points so that said substantial portion now projects below the looper points and a plurality of looper points lay in each interstice of said leg fabric substantially similar to said portions sandwiched between the weft knitted flaps; and looping the weft knitted flaps with the mesh-like material therebetween.

20. The method of manufacturing a stocking of the character described comprising: forming a foot blank by weft knitting heel fabrics with pairs of paralleling flaps extending therefrom; then transferring said heel fabrics to knit thereonto sole fabrics extending in a direction at substantially right angles to that of said flaps, and weft knitting a toe fabric as a continuation of said sole fabrics with a pair of paralleling flaps extending between the sole fabrics; cutting a combination leg and instep blank out of open work mesh-like fabric; topping the marginal edge of one of each of said pairs of weft knitted flaps so that each looper point subtends its corresponding needle loop; topping on the looper points the corresponding portions of said open work mesh-like fabric so that a plurality of looper points lay in each interstice with a substantial portion of said leg fabric above the looper points and a restricted portion of said fabric extends below said points; topping the marginal edge of the other of each pair of weft knitted flaps so that each looper point subtends its corresponding needle loop thereby sandwiching the restricted extended portion between the two mentioned weft knitted flaps; folding downwardly a substantial portion of the mesh-like leg fabric which previously projected above the looper points so that said substantial portion now projects below the looper points and a plurality of looper points lay in each interstice of said leg fabric substantially similar to said portions sandwiched between the weft knitted flaps; and looping the left knitted flaps with the mesh-like material therebetween.

CHARLES A. KAUFMAN.